(12) United States Patent
Sellschopp (10) Patent No.: US 9,317,086 B2
(45) Date of Patent: Apr. 19, 2016

(54) APPARATUS AND METHOD FOR INITIATING A CHARGING PROCESS OF AN ELECTRIC VEHICLE

(71) Applicants: VOLKSWAGEN AG, Wolfsburg (DE); AUDI AG, Ingolstadt (DE)

(72) Inventor: Stefan Sellschopp, Palo Alto, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 410 days.

(21) Appl. No.: 13/678,798

(22) Filed: Nov. 16, 2012

(65) Prior Publication Data

US 2014/0142770 A1   May 22, 2014

(51) Int. Cl.
G06F 1/26 (2006.01)
B60L 11/18 (2006.01)
B60L 3/12 (2006.01)

(52) U.S. Cl.
CPC ... G06F 1/26 (2013.01); B60L 3/12 (2013.01); B60L 11/1816 (2013.01); B60L 11/1838 (2013.01); B60L 11/1844 (2013.01); B60L 11/1846 (2013.01); B60L 11/1861 (2013.01); B60L 2230/16 (2013.01); B60L 2240/622 (2013.01); B60L 2240/662 (2013.01); B60L 2240/68 (2013.01); B60L 2240/72 (2013.01); B60L 2250/12 (2013.01); B60L 2250/16 (2013.01); B60L 2250/18 (2013.01); B60L 2260/52 (2013.01); B60L 2260/54 (2013.01); Y02T 10/7005 (2013.01); Y02T 90/121 (2013.01); Y02T 90/128 (2013.01); Y02T 90/14 (2013.01); Y02T 90/163 (2013.01); Y02T 90/168 (2013.01); Y04S 30/12 (2013.01)

(58) Field of Classification Search
None
See application file for complete search history.

(56) References Cited

U.S. PATENT DOCUMENTS

| | | | | |
|---|---|---|---|---|
| 5,049,802 A * | 9/1991 | Mintus et al. | | 320/107 |
| 2009/0312903 A1* | 12/2009 | Hafner et al. | | 701/36 |
| 2009/0313032 A1* | 12/2009 | Hafner et al. | | 705/1 |
| 2009/0313033 A1* | 12/2009 | Hafner et al. | | 705/1 |
| 2009/0313034 A1* | 12/2009 | Ferro et al. | | 705/1 |
| 2009/0313098 A1* | 12/2009 | Hafner et al. | | 705/14.1 |
| 2010/0049533 A1* | 2/2010 | Ferro et al. | | 705/1 |
| 2010/0049610 A1* | 2/2010 | Ambrosio et al. | | 705/14.62 |
| 2010/0049737 A1* | 2/2010 | Ambrosio et al. | | 707/104.1 |
| 2011/0191265 A1* | 8/2011 | Lowenthal et al. | | 705/412 |
| 2012/0179323 A1* | 7/2012 | Profitt-Brown et al. | | 701/29.1 |
| 2012/0296678 A1* | 11/2012 | Boot et al. | | 705/5 |

FOREIGN PATENT DOCUMENTS

WO   WO 2014/075889   *   5/2014

* cited by examiner

Primary Examiner — Mohammad Ali
Assistant Examiner — Bernard G Lindsay
(74) Attorney, Agent, or Firm — Barnes & Thornburg LLP (57) ABSTRACT

Embodiments relate to initiating a charging process of an electric vehicle according to predefined charging preferences. An association between the electric vehicle and a user profile including the predefined charging preferences is established. The user profile is stored in a memory within a distributed processing network. A charging request message related to the electric vehicle is provided to a remote charging request message processor of the distributed processing network, the charging request message indicating a charging need of the electric vehicle. The charging request message is processed using the user's predefined charging preferences stored in the user profile to obtain user specific result data, including information on one or more charging stations corresponding to the predefined charging preferences. From the remote charging request message processor, a result message related to the electric vehicle is provided including the obtained user specific result data for initiating the charging process.

15 Claims, 3 Drawing Sheets

APPARATUS AND METHOD FOR INITIATING A CHARGING PROCESS OF AN ELECTRIC VEHICLE

Embodiments of the present invention relate to apparatuses and methods for initiating a charging process of an electric vehicle, in particular for initiating an electric charging process of an electric vehicle based on predefined charging preferences.

BACKGROUND

An electric vehicle (EV), which may also be referred to as an electric drive vehicle, typically uses one or more electric motors for propulsion. In general, there are three main types of electric vehicles:
- EVs that are directly powered from an external power station,
- EVs that are powered by stored electricity originally from an external power source, and
- EVs that are powered by an on-board electrical generator, such as an internal combustion engine (a hybrid electric vehicle) or a hydrogen fuel cell.

Electric cars are electric vehicles that are powered by using electrical energy stored in batteries or another energy storage device. The batteries may be charged by means of an electric vehicle charging station. As the number of electric vehicles increases, the availability of electric vehicle charging stations to reliably provide electricity to the electric vehicles takes on increasing importance. Like conventional gas stations, current electric vehicle charging stations are available on a first come, first serve basis. However, charging a rechargeable energy storage system of an electric vehicle can take a substantial amount of time. Moreover, the future number of electric vehicles could exceed the available number of electric vehicle charging stations. That is to say, a user of an electric vehicle is dependent on the availability of electric vehicle charging stations. It is not only important to find one when it is needed, but it is also preferable to be able to use a charging station once you have found it.

Consequently, there is a need to know that a charging station is available, that it is possible to reserve it, and to make the reservation in a practical and convenient way during driving.

SUMMARY

Embodiments of the present invention propose an integrated solution to find, check and book charging stations for an electric vehicle. It is one finding that the user can preconfigure his charging desires in terms of charging prices, plug types, charging station maker, charging service providers (which allow free charging based on subscriptions for example), length or duration of default reservation periods, etc., by laying down charging preferences in a user profile. Said user profile may then be used to ease the charging station booking in the vehicle before or during driving.

According to a first aspect it is provided a method for initiating a charging process of an electric vehicle according to predefined charging preferences. Thereby the method comprises a step of establishing an association between the electric vehicle and a user profile comprising the predefined charging preferences, wherein the user profile is stored in a memory within a distributed processing or computing network. To initiate the charging process a charging request message related to the electric vehicle is provided to a remote charging request message processor of the distributed processing network, wherein the charging request message indicates a charging need of the electric vehicle. The charging request message is then processed using the user's predefined charging preferences stored in the user profile to obtain user specific result data, wherein the user specific result data comprises information on one or more charging stations corresponding to the predefined charging preferences. A result message related to the electric vehicle is then provided from the remote charging request message processor, wherein the result message comprises the obtained user specific result data allowing the initiation of the electric charging process.

According to some embodiments the user may be allowed to use his user profile for a plurality of electric vehicles, as he or his family may be in possession of more than one electric car, for example. For that reason an association or a link between a particular electric vehicle and the user profile has to be established, for example, by adding said vehicle to the user profile or user account. In some embodiments this may be done by depositing vehicle identification (for example a unique number) in the user profile. The vehicle identification or a quantity derived therefrom may then be used to access the user profile from the electric vehicle, for example. According to one embodiment establishing the association may further comprise obtaining a unique authentication code indicating the association between the electric vehicle and the user profile. Upon providing the identification of the electric vehicle to the user profile, establishing the association may further comprise providing the unique authentication code to the remote charging request message processor to get access to the user profile for the identified electric vehicle. For example, the unique authentication code may also be provided to the charging request message processor by means of the charging request message.

According to some embodiments the user's predefined charging preferences stored in the user profile may comprise at least one filter or selection criterion for filtering or sorting out results in response to the charging request message, which meet the user's preferences. Thereby the filter criterion may comprise at least one criterion of the group of electrical charge pricing of interest, charging station type of interest, charging station provider of interest, and a preferred charging station reservation period, for example. The user specific filter criteria may be stored in the memory within the distributed computing network as a part of the user profile. In some embodiments the user profile may be stored as one of many different user profiles in a database, for example, wherein the database may be coupled to a web service or a cloud computing service configured to support an interoperable machine-to-machine interaction over a computer network, such as the Internet. Hence, the user profile may be accessed and administered by means of a cloud service according to some embodiments. The cloud service may be accessed by logging into an OEM (Original Equipment Manufacturer) website, for example, providing web or cloud services tied to the electric vehicle of the OEM.

The predefined charging preferences or filter criteria serve for determining user specific results of interest, wherein the results of interest may comprise a list of charging stations meeting at least some of the user specific desired criteria. For example, if the user profile indicates only one preferred charging station provider, the user specific result data may only comprise charging stations of said preferred charging station provider. If the user profile indicates a preferred charging station reservation period of at least two hours, the user specific result data may comprise charging station that are continuously available for charging at least two hours. That is to say, the predefined charging preferences define the scope of results the user will get announced or displayed in response to his charging request.

The charging request may be initiated manually by the user or automatically. In the latter case a processor module having access to navigational and/or conditional data of the electric vehicle may initiate the charging request. For example, the charging request message may be sent if a current state of charge of the electric vehicle falls below a predefined minimum state of charge, which may have been defined by the user in his user profile or which may be set depending on a way of driving the electric vehicle, according to some embodiments. For example, if the electric vehicle is driven in a rather energy consuming fashion the minimum state of electric charge may be set higher compared to a comparatively low energy consuming fashion of driving. Setting the minimum state of charge may also be done automatically by the processor module having access to navigational and/or conditional data of the electric vehicle, such as motor control data, for example. The automatic request can also be done based on an expected route. So the system can provide possible charging stations along the route. A navigation system or a learning system as such can predict where the user/driver will go and how much energy will be left in the battery at any point along the route (based on the past energy consumption of this specific driver, other cars like this one and considering the current conditions like temperature and traffic on that route). So based on the minimum charge level defined by the user, the request for available charging stations can be done well in advance before reaching a low charge level in order to still allow driver to find alternatives, should all preferred stations (according to the preferences profile) should be unavailable.

In some embodiments the processor module initiating the charging request may be fixedly installed within the electric vehicle. For example, the processor module may be part of an infotainment system of the electric vehicle or car, referring to a type of media system which provides a combination of information and entertainment. In other embodiments the processor module may not necessarily be fixedly installed within the electric vehicle. It may as well be comprised by a portable device, such as a smartphone, a tablet-PC, a laptop computer, or the like. A smartphone may act as a navigation system in the car, for example. Further, it may even be linked to an On-Board Diagnosis (OBD) system, thereby providing access to state of health information for various electric vehicle sub-systems and State of Charge information.

For transferring the charging request message from the electric vehicle to the remote charging request message processor of the distributed computing network, such as the internet, the electric vehicle may be coupled to a wireless transceiver having transmitter as well as receiver capabilities. For example, an internal transceiver or a smartphone may be used for this. The wireless transceiver may employ wireless access technologies, such as present or future wireless communication networks e.g. standardized by the 3$^{rd}$ Generation Partnership Project (3GPP), as Global System for Mobile Communications (GSM), Enhanced Data rates for GSM Evolution (EDGE), GSM EDGE Radio Access Network (GE-RAN), Universal Terrestrial Radio Access Network (UT-RAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA). While the wireless transceiver may be fixedly installed within the electric vehicle it may also be comprised by a portable device, such as smartphone, a tablet-PC, a laptop computer, or the like, which may be referred to as User Equipment (UE) according to 3GPP terminology.

The remote charging request message processor may be provided by one or more charging request message servers, which may be server entities provided by the OEM, for example. Such a server entity may have access to the user profile by accessing or entering a user profile database stored either on the same server hardware or on some other (remote) hardware in the cloud computing system. Furthermore, the charging request message processor may have access to charging station information provided by at least one (commercial) charging station provider. The charging station information, which may be deposited in at least one charging station information database of the cloud computing system, may comprise at least one of the group of geographical location data of charging stations, information on the availability/reservability of charging stations, information on the type of charging station (e.g. including plug type, electrical power, etc.), and information on the pricing of a charging station. For obtaining the user specific result data the remote charging request message processor may be configured to compare the user's predefined charging preferences against the charging station information provided by the at least one charging station provider in order to find matching results corresponding to the user's desires. Hence, the obtained user specific result data may comprise a match between the user's predefined charging preferences and the charging station information provided by the at least one charging station provider.

In order to keep the charging station information database up-to-date the charging station information may be provided essentially under real-time constraints, i.e., charging station information updates may be delivered to the database or the charging request message processor in the order of milliseconds or even microseconds from the time when they actually happened. That is to say, if a certain charging station of a charging station provider changes its state from "occupied" to "available", this change of state may be immediately reported from a charging station provider's computer system to the charging station information database or the charging request message server, so that a user can potentially book or reserve said charging station in case it meets his predefined charging preferences specified in the user profile.

All matching results provided by the charging request message processor may be packed into the result message related or dedicated to the electric vehicle. Actually this information could also be preprocessed specifically for each user and continuously updated into the vehicle. A possible implementation could use a virtual map overlay, which has all the relevant Points-Of-Interest (POIs), including all the relevant information for each POI according to the preferences (e.g. availability for predefined timeslots). In some embodiments said result message is delivered to the electric vehicle from the charging request message processor. Again, the result message may be delivered to a fixedly installed infotainment system of the electric vehicle or a portable device in the electric vehicle, such that the contained user specific result data may be adequately displayed audio-visually for initiating the charging process. For example, available charging stations of user specific result data may be displayed by listing their respective location, their type (e.g. electrical power supply), and/or their availability period. Also, the time of obtaining the user specific result data may be displayed. Initiating the charging process may also be understood as making a reservation of a charging station corresponding to the user's predefined charging preferences. That is to say, the method may also comprise reserving a charging station meeting the user's predefined charging preferences and comprised by the user specific result data. For that purpose a corresponding apparatus for performing a method according to embodiments may comprise a user interface, where the user may choose one or more charging station alternatives comprised by the user specific result data. The user interface may be a touchscreen of an on-board infotainment system or a smartphone, for example, or any other adequate device.

The reservation of a matching charging station may take into account an expected arrival time of the electric vehicle at said charging station. This expected arrival time may be obtained from a navigation system, which may be entirely on board the vehicle, or which may be located elsewhere and communicate via radio or other signals with the vehicle, or which may be based on a combination of these methods. For example, the navigation system may be based on the well-known Global Positioning System (GPS).

As indicated above, according to a further aspect it is also provided an apparatus for initiating a charging process of an electric vehicle according to predefined charging preferences. The apparatus comprises a module which is operable to establish an association between the electric vehicle and a user profile comprising the predefined charging preferences, wherein the user profile is stored in a memory within a distributed processing network. The apparatus further comprises a transmitter which is operable or configured to transmit a charging request message related to the electric vehicle to a remote charging request message processor of the distributed processing network, wherein the charging request message indicating a charging need of the electric vehicle. Also, the apparatus comprises a receiver which is operable to receive a result message in response to the charging request message from the remote charging request message processor, the result message comprising user specific result data based on the user's predefined charging preferences stored in the user profile, the user specific result data comprising information on one or more charging stations (from one or more charging station providers) corresponding to the predefined charging preferences.

According to some embodiments such an apparatus may be fixedly or loosely installed within the electric vehicle. For example, the apparatus may be comprised by a fixedly or loosely installed infotainment system of the electric vehicle. Thereby, a loosely installed infotainment system may be provided by a smartphone, a tablet-PC, a laptop computer, or the like.

Some embodiments comprise a digital control circuit installed within an apparatus for performing at least one of the above methods. Such a digital control circuit, e.g. a Digital Signal Processor (DSP) or an Application Specific Integrated Circuit (ASIC), needs to be programmed accordingly. Hence, yet further embodiments also provide a computer program having a program code for performing embodiments of the methods, when the computer program is executed on a computer or a digital processor.

According to yet, a further aspect of the present invention it is also provided an electric vehicle comprising an apparatus according to embodiments.

Further, it is also provided an apparatus for initiating or preparing a charging process of an electric vehicle according to predefined charging preferences stored in a user profile associated to the electric vehicle, wherein the user profile is stored in a memory within a distributed processing network. The apparatus comprises a receiver which is operable to receive a charging request message related to the electric vehicle, the charging request message indicating a charging need of the electric vehicle. Said apparatus also comprises a charging request message processor which is operable to process the charging request message using the user's predefined charging preferences stored in the user profile to obtain user specific result data, wherein the user specific result data comprises information on one or more charging stations corresponding to the predefined charging preferences. A transmitter of the apparatus is operable to transmit a result message related to the charging request message, the result message comprising the obtained user specific result data for initiating the charging process. The latter apparatus may, for example, be comprised by at least one programmable web or cloud server hardware component providing the personalized charging reservation service.

Embodiments may enable an integrated solution to find, check and book charging stations for an electric vehicle. A user can preconfigure his electric charging desires, for example, in terms of charging prices, plug types, charging station providers, length or duration of default reservation periods, etc., by laying down charging preferences in a user profile. Said user profile may then advantageously be used to ease the charging station booking/reservation in the vehicle during driving. Additionally, the expected arrival time at a charging station may be taken into account in order to check availability and start the reservation from that point of time if permitted by the station provider, leading to customizable and automated charging station reservation system considering the user's personal preferences.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
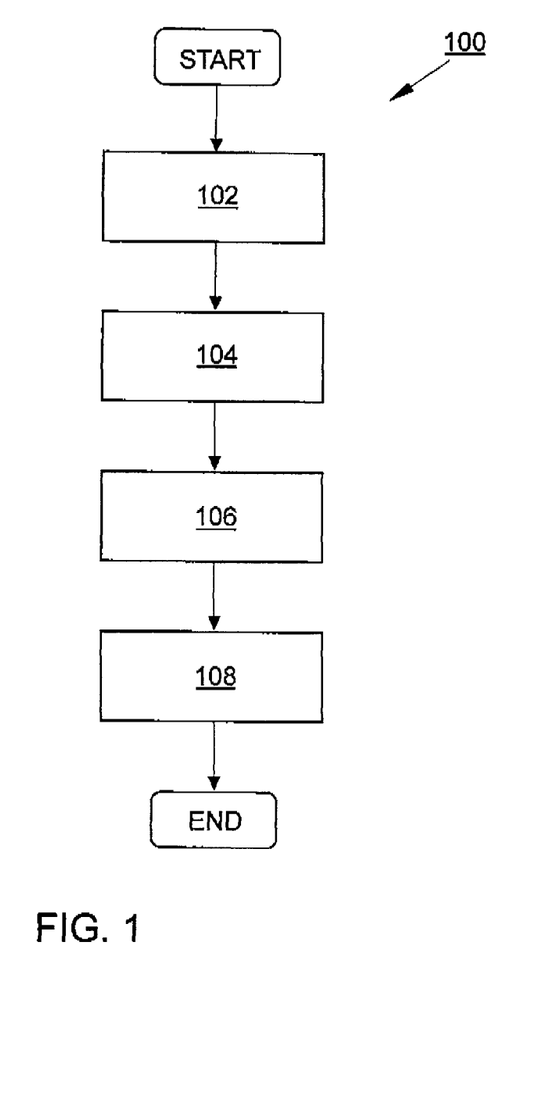
FIG. 1 shows a schematic flowchart of an exemplary method for initiating or preparing an electric charging process of an electric vehicle.

FIG. 1 shows a schematic flowchart of a method 100 for initiating or preparing an electric charging process of an electric vehicle according to a user's predefined charging preferences.

The method 100 comprises an initial step 102 of establishing an association or relation between the electric vehicle and a user profile comprising or referring to the predefined charging preferences. The user profile may be stored in a memory device within or of a distributed processing network, which may be a cloud computing network, for example. Further, the method 100 comprises a step 104 of providing a charging request message related to the electric vehicle to a remote charging request message processor of the distributed processing network. The remote charging request message processor may be coupled to the memory device storing the user profile. The charging request message indicates a charging need of the electric vehicle. In a further step 106 the charging request message processor may process the charging request message using the user's predefined charging preferences linked to the user profile in order to obtain user specific result data. Thereby the user specific result data comprises information on one or more charging stations of one or more charging station providers, wherein characteristics of the charging stations listed in the user specific result data correspond to or match the predefined charging preferences. After having determined the user specific result data in step 106, a result message related or dedicated to the electric vehicle is provided from the remote charging request message processor in response to the charging request message in a further step 108. Thereby the result message comprises the obtained user specific result data which may be used for initiating or reserving the charging process.

The user's predefined charging preferences define the user's personal desires with respect to electric charging modalities. Hence, the user's predefined charging preferences may also be understood as filter criteria for filtering out or selecting specific charging stations from a charging station network comprising charging stations of one or more commercial providers, wherein the selected charging stations fulfill the user's requirements or desires at least to some extent. The user's predefined charging preferences may hence comprise at least one filter criterion for filtering potential results in response to the charging request message, wherein the at least one filter criterion comprises at least one criterion of the group of an electrical charge pricing of interest, a charging station plug type of interest, a charging station provider/or maker of interest, and/or a preferred charging station reservation period.

For example, if the user is interested in getting reasonably priced offers for electrically charging his electric vehicle he may, for example, specify a pricing of interest below a certain maximum price limit. Alternatively or additionally the user may also specify only certain charging station providers he wants to use. These may be charging station providers the user has subscriptions with, for example. Another aspect may be to specify certain charging station types of interest meeting electric specifications of the user's electric vehicle. For example, the electric vehicle may only allow specific electric powers of charging stations and/or specific plug or socket types. The user may prefer fast charging stations, for example. Also, the user may prefer single or three phase vehicle couplers over direct current power supplies. Therefore the user may not be interested in any charging stations which are not meeting the technical requirements of his electric vehicle, i.e., which are not technically matching his vehicle. Alternatively or additionally the user may specify a minimum or maximum charging station reservation time period. For example, the user may not be interested in charging stations which may only be reserved for a short time as this will not allow to sufficiently recharge his electric vehicle.

During processing the charging request message in step 106 the user's preferences stored in the user profile may be compared to charging station information which may be provided to the remote charging request message processor by at least one charging station provider of a charging station network. Preferably, the charging station information may be provided essentially in real-time by the at least one charging station provider in order to guarantee for up-to-date information. Thereby, the charging station information may comprise at least one of the group of geographical location data of the charging stations, availability/reservability of charging stations, the type of charging stations, and/or the pricing of charging stations.

The geographical location data of charging stations may be of interest as a user usually wants to book a charging station in vicinity or reachability of his electric vehicle. Finally, the user needs to reach the booked charging station with a remaining electric capacity (state of charge) of his electric vehicle, which may be rather low. The availability or reservability of a charging station may indicate if and when a particular charging station is bookable for example. If a charging station is only available at night, however the user has specified the need for a charging station during daytime in his profile, said charging station does not meet his preferences or desires and may therefore not be listed in the user specific result data. As mentioned before, the type of charging station may comprise information on electric power capabilities and/or plug or socket types of an electric charging station.

To summarize, during step 106 of processing the charging request message the charging request message processor attempts to find matches between the user's predefined charging preferences and the charging station information provided by the at least one charging station provider in order to determine the user specific result data. In this way only desired charging stations matching his personal preferences may be presented to the user.

After having provided an overview of the method 100 for initiating a charging process of an electric vehicle according to a user's predefined charging preferences, more details of individual method-steps and/or components of a user profile based charging station service will be provided in the sequel.

Figure 2:
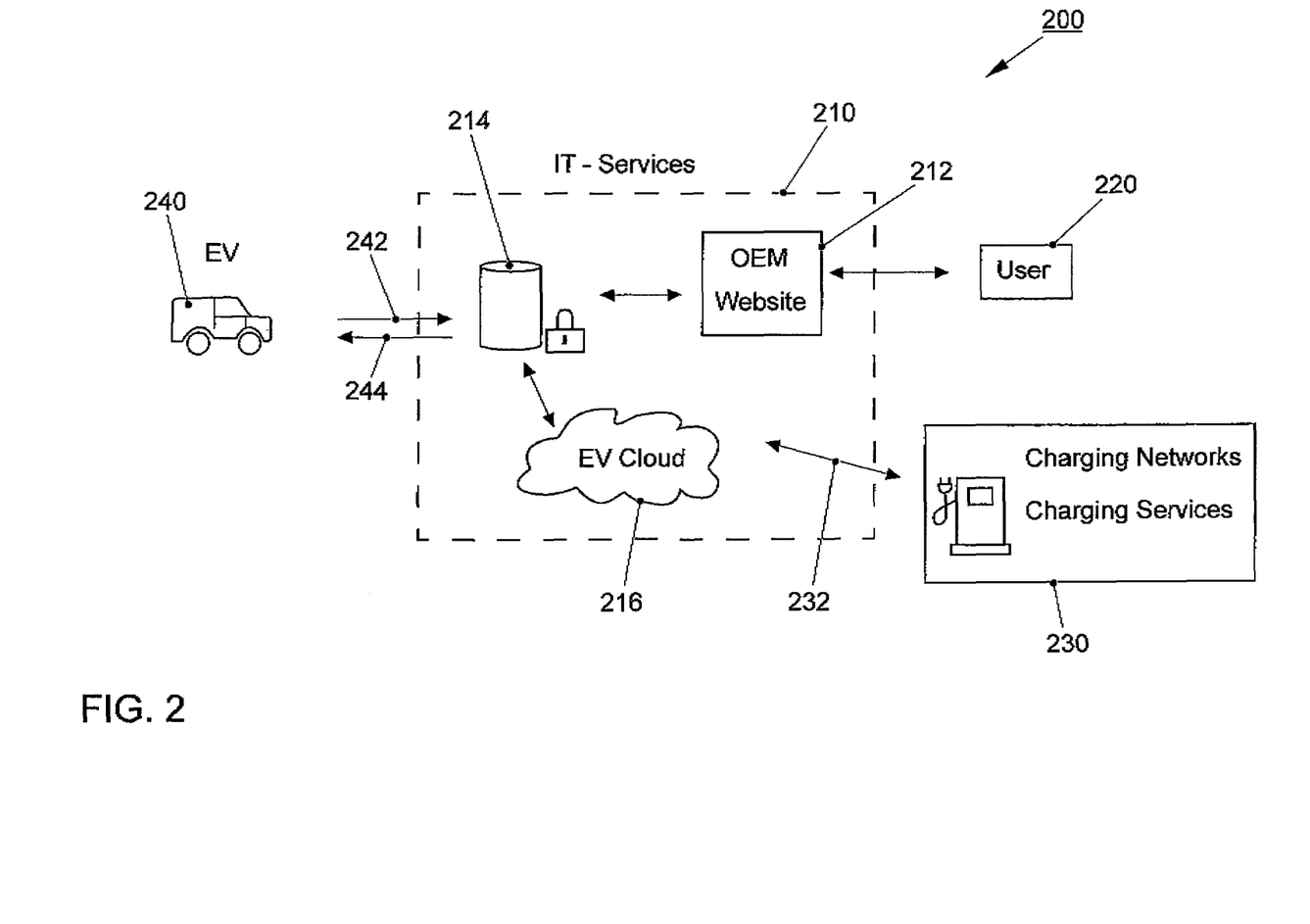
FIG. 2 shows a schematic overview of a user profile based charging station service system, according to an embodiment of the present invention.

Turning now to FIG. 2, it is shown a schematic overview of the user profile based charging station service system 200 for realizing the method 100 for initiating the electric charging process.

Some central elements of the system 200 are provided by one or more IT-services 210 (IT=Information Technology). The IT services 210 comprise an OEM web service 212 which may act as a user interface for a user 220. By means of the OEM web service 212 the user 220 may set up and specify his user profile, which may be stored in a secure database coupled to an OEM server 214 of the system 200. Thereby the OEM server 214 may be regarded as a charging request message processor. Charging station information 232 of different charging services or charging providers 230 may be aggregated by an EV cloud service 216 by using computing resources (hardware and/or software) that are delivered as a service over a network, typically the Internet. That is to say, one or more charging service providers may provide their respective charging station information 232 to the EV cloud service 216, preferably under real-time constraints. Moreover, the EV cloud service 216 may provide said charging station information to the OEM server 214, such as geographical location data of charging stations, availability of charging stations, the type of charging stations, and/or the pricing of charging stations, etc. This real-time charging station information may be kept updated continuously.

The IT-services 210 making use of the user profile with the predefined charging preferences and the charging station information may also be addressed or accessed from the electric vehicle 240 by means of one or more charging request messages 242 from the electric vehicle 240 to the OEM server 214. After having processed a charging request message 242, a result message 244 related to the electric vehicle 240 may be provided from the OEM server 214 to the electric vehicle 240.

For establishing his user profile the user 220 may log into or onto the OEM website 212 by providing a user specific username and/or a password, for example. This may be done from a home PC (PC=Personal Computer), for example. The user 220 may add one or more electric vehicles 240 to his user account or user profile by providing a specific vehicle identification number (VIN) of the respective vehicle 240, thereby allowing the personalized vehicle specific charging services according to embodiments of the present invention. Hence, the user profile may comprise an identification of the electric vehicle 240. Certain things might be personalized to vehicle (plug type, if OEM offers free charging for this specific vehicle etc.), others might be user specific (personal preferences, memberships etc.)

In response to adding an electric vehicle 240 to his user account the user 220 may then obtain a unique electric vehicle specific authentication code which he may later enter in his electric vehicle 240 in order to access his user account from the vehicle 240. That is to say, the step 102 of establishing the association between the electric vehicle and the user profile may further comprise obtaining a unique authentication code indicating the association between the electric vehicle 240 and the user profile.

For example, the user 220 may also provide subscriptions to the user profile he has with one or more certain commercial charging service providers. That is to say, the user may specify one or more preferred charging station providers in his profile. Such subscriptions may indicate that the user 220 may electrically charge at certain charging stations for free or at a reduced rate or with some other preferential treatment.

The user profile information may be provided to the OEM server 214 or to a connected database, which may then deliver the charging station services to all participating electric vehicles 240. Also, the different charging station networks and the charging service providers may provide real-time charging station information to the OEM server 214 or a connected database, the charging station information being aggregated by something like one or several abstraction layers like the EV cloud 216.

When the electric vehicle 240 or a device coupled thereto wants to connect to the OEM server 214 for booking/reservation purposes, a Vehicle Identification Number (VIN) of the electric vehicle 240 may be provided to the OEM server 214. Additionally or alternatively the user may have to enter the unique authentication code which has been provided by the OEM website 212 during the sign-up process. In some embodiments the unique authentication code may also be sent to the server 214 from the vehicle 240 automatically. That is to say, the step 102 of establishing the association may further comprise, upon providing the identification of the electric vehicle 240 to the remote charging request message processor 214, providing the unique authentication code to the remote charging request message processor 214 in order authenticate the user and/or to get access to the stored user profile for the vehicle 240. The unique authentication code may be stored in the vehicle 240 according to some embodiments in order to link the unique authentication code to the user profile in the vehicle 240. Hence, establishing 102 the association may also comprise storing the unique authentication code in a memory device of the electric vehicle 240. After having set up the association between the electric vehicle 240 and the user profile charging request messages related to the electric vehicle 240 may be sent to the remote server 214 from the vehicle 240. Thereby, each charging request message may also comprise the unique authentication code as an authentication and/or identification of the electric vehicle 240.

Having obtained a charging request message 242 from the electric vehicle 240, the OEM server 214 may identify the request 242 from the electric car 240 and link it to the driver's or user's profile. User specific result data 244 may be prepared in a way that the user has decided he likes best. In other embodiments the system may have learned that automatically. For example, one charging preference of the user may be to have the availability of charging stations visualized in certain time periods, like 1, 3, 5 hours, for example. The contents provided by OEM server 214 may be tailored according to the user profile, only preferring, for example, content from the user's existing charging station provider subscriptions.

In some embodiments the system 200 or the OEM server 214 may predict the next drive, destination, route, and/or arrival time based on the provision of current active route guidance for the vehicle 240. That is to say, navigational data (e.g. geographic location of vehicle 240) may also be comprised in a charging request message. In other embodiments the server 214 could have recorded past trips allowing it to predict at least some of the latter quantities (drive/destination/route/arrival time, etc.). In some embodiments the charging request 242 to the server 214 may be done by the vehicle 240 preemptively, so the driver can be offered relevant, preferred charging stations when and where the driver might need them. For that purpose the charging request message 242 may be initiated from a processor module installed within the electric vehicle, wherein the processor module may have access to navigational and/or charging state data of the vehicle 240. The processor module may be coupled to a wireless transceiver which is operable to transmit the charging request message 242 to the remote charging request message processor 214 and/or which is operable to receive the result message 244 from the remote charging request message processor 214. For example, the driver can define in his user profile, which may be stored on the server 214 or on a database coupled thereto, what the minimum state of charge should be when he needs to recharge, as, for example, 10%, 20% or 30% state of charge of the battery. That is to say the predefined charging preferences or the user profile may comprise a minimum state of charge of the electric vehicle 240. The charging request message 242 may then automatically be provided to the remote charging request message processor 214 if a current state of charge of the electric vehicle 240 falls below said minimum state of charge.

According to embodiments the driver of the electric vehicle 240 may reserve a charging station by confirming a suggestion of the system provided by means of the result message 244. Thereby the provision of the result message 244 may comprise providing audio and/or visual result data via an infotainment output device of the electric vehicle 240. An infotainment input device, such as a touchscreen, for example, may be used to make a convenient charging station reservation according to the user's predefined preferences. In some embodiments the user only needs to choose one of a plurality of suggested charging stations all matching his requirements.

Embodiments of the present invention also provide apparatuses for performing the method 100.

Figure 3A:
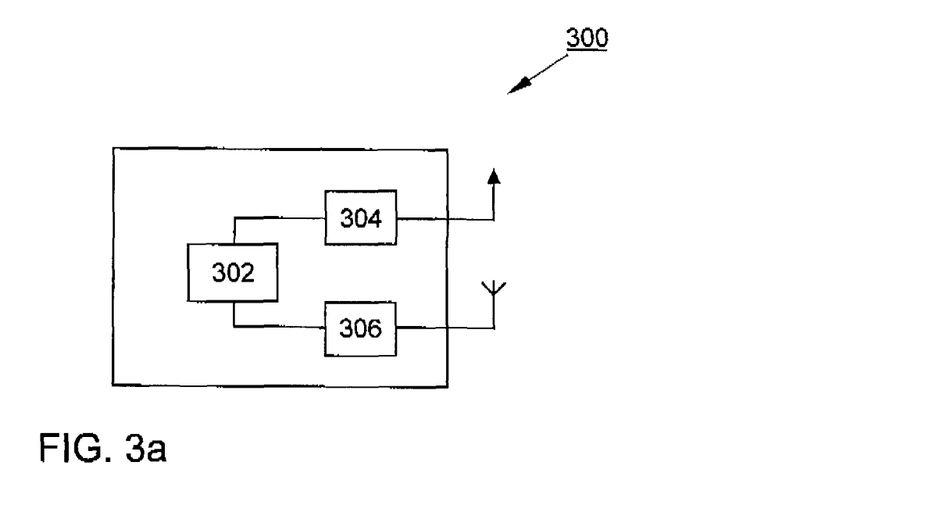
FIG. 3a shows a block diagram of a first apparatus for initiating a charging process of an electric vehicle according to predefined charging preferences.

FIG. 3a schematically illustrates an apparatus 300 for initiating a charging process of an electric vehicle according to predefined charging preferences. The apparatus 300, which may be used in an electric vehicle 240, for example, comprises a module 302 which is operable to establish an association between the electric vehicle 240 and a user profile comprising the predefined charging preferences, wherein the user profile is stored in a memory within a distributed processing network. For example, the module 302 may be configured to receive and to forward the unique authentication code to the remote charging request message processor 214. The apparatus 300 further comprises a transmitter 304 operable to transmit a charging request message 242 related to the electric vehicle 240 to the remote charging request message processor 214 of the distributed processing network, the charging request message indicating a charging need of the electric vehicle 240. A receiver 304 of the apparatus 300 is operable to receive a result message 244 in response to the charging request message 242 from the remote charging request message processor 214, the result message 244 comprising user specific result data based on the user's predefined charging preferences stored in the user profile, the user specific result data comprising information on one or more charging stations from one or more charging station providers 230 corresponding to the predefined charging preferences.

In one embodiment the apparatus 300 may be part of on-board infotainment system hardware. According to other embodiments the apparatus 300 may be part of a portable device, such as a smartphone, a tablet-PC, a laptop computer, or the like.

Figure 3B:
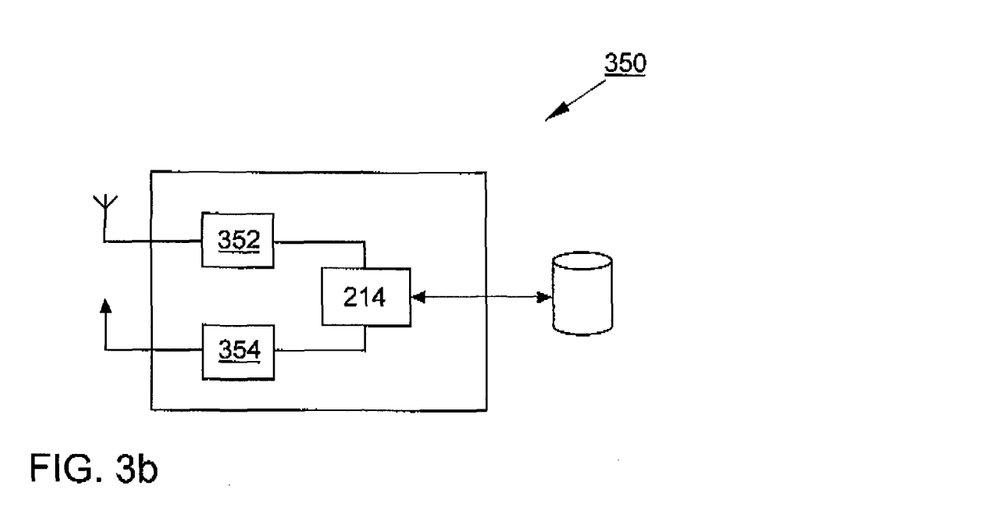
FIG. 3b shows a block diagram of a second apparatus for initiating a charging process of an electric vehicle according to predefined charging preferences.

FIG. 3b schematically illustrates another apparatus 350 for initiating a charging process of an electric vehicle according to predefined charging preferences, according to one embodiment.

The apparatus 350, which may be used in conjunction with an OEM server 214, comprises a receiver 352 operable to receive a charging request message 242 related to the electric vehicle 240, the charging request message indicating a charging need of the electric vehicle 240. A charging request message processor 214 of apparatus 350 is operable to process the charging request message 242 using the user's predefined charging preferences stored in the user profile to obtain user specific result data, the user specific result data comprising information on one or more charging stations corresponding to the predefined charging preferences. A transmitter 354 of apparatus 350 is operable to transmit a result message 244 in response to the charging request message 242, the result message 244 comprising the obtained user specific result data for initiating the charging process.

To summarize, on an OEM Web Portal, as may be provided by an OEM, a driver/user can set his charging preferences. For example: Which charging Station Providers does he want to have listed in his navigation System? Which default Charge length does he want to have displayed (e.g. 1 h, 3 h, 5 h)? Does he want to have a safety buffer (time wise) to reserve stations (e.g. "try to book the station approximately 30 minutes or 10% of the remaining driving time before getting there")? The user may configure which charging ID is used for which charging station provider to reserve a charging station. Further the user may specify at what charge level his car should propose to recharge when traveling. This configuration of the preferences can be done in the vehicle or on the Web portal and both may be synchronized to have the latest user settings at hand whenever the users goes and whatever vehicle the user is driving. According to embodiments the driver may see available stations displayed on a map (color codes may provide information about the availability and how long a particular station will be reservable and/or what the cost would be). For example, available charging stations of user specific result data may be displayed by listing their respective geographic location, their type (e.g. electrical power supply, available plugs, etc.), and/or their availability/reservability time slots. Also, the time of obtaining the user specific result data may be displayed. The driver may then confirm the proposed reservation by e.g. clicking a charging station, via voice, or via gesture control.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A method for reserving a charging station for an electric vehicle according to predefined charging preferences, the method comprising:
   establishing an association between the electric vehicle and a user profile comprising the predefined charging preferences, the predefined charging preferences comprising at least one filter criterion for filtering results in response to a charging request message, the filter criterion comprising at least one criterion of the group of electrical charge pricing of interest, charging station type of interest, charging station provider of interest, and a preferred charging station reservation period, wherein the user profile is stored in a memory within a distributed processing network;
   when a current state of charge of the electric vehicle falls below a minimum state of charge defined by the user profile, and depending on a way of driving the electric vehicle, providing the charging request message related to the electric vehicle to a remote charging request message processor of the distributed processing network, the charging request message indicating a charging need of the electric vehicle, wherein the charging request message is initiated from a processor module installed within the electric vehicle, the processor module having access to navigational or charging state data of the vehicle;
   processing the charging request message using the user's predefined charging preferences stored in the user profile to obtain user specific result data, the user specific result data comprising information on a list of available charging stations corresponding to the predefined charging preferences and a time of obtaining the user-specific result data; and
   providing, from the remote charging request message processor, a result message related to the electric vehicle in response to the charging request message, the result message comprising the obtained user specific result data for initiating the charging process; and
   reserving a charging station meeting the user's predefined charging preferences based on the user specific result data.

2. The method of claim 1, wherein processing the charging request message is further based on charging station information provided to the remote charging request message processor by at least one charging station provider the charging station information comprises at least one of the group of geographical location data of charging stations, availability of charging stations, type of charging station, and pricing of a charging station.

3. The method of claim 2, wherein the obtained user specific result data comprises a match between the user's predefined charging preferences and the charging station information provided by the at least one charging station provider.

4. The method of claim 2, wherein the charging station information is provided essentially in real-time by the at least one charging station provider.

5. The method of claim 1, wherein said charging station is reserved based on at least an expected arrival time of the electric vehicle at said charging station.

6. The method of claim 1, wherein the user profile comprises an identification of the electric vehicle.

7. The method of claim 6, wherein establishing the association further comprises obtaining a unique authentication code indicating the association between the electric vehicle and the user profile.

8. The method of claim 7, wherein establishing the association further comprises, upon providing the identification of the electric vehicle to the remote charging request message processor, further providing the unique authentication code to the remote charging request message processor to get access to the user profile.

9. The method of claim 7, wherein establishing the association comprises storing the unique authentication code in a memory device of the electric vehicle.

10. The method of claim 7, wherein the processor module is coupled to a wireless transceiver operable to transmit the charging request message to or operable to receive the result message from the remote charging request message processor.

11. The method of claim 1, wherein providing the result message comprises providing audio or visual result data via an infotainment output device of the electric vehicle.

12. A non-transitory computer readable medium having a program code for performing the steps of the method of claim 1.

13. An apparatus for reserving a charging station for an electric vehicle according to predefined charging preferences, the apparatus comprising:
a module operable to establish an association between the electric vehicle and a user profile comprising the predefined charging preferences, the predefined charging preferences comprising at least one filter criterion for filtering results in response to a charging request message, the filter criterion comprising at least one criterion of the group of electrical charge pricing of interest, charging station provider of interest, charging station type of interest, and a preferred charging station reservation period, wherein the user profile is stored in a memory within a distributed processing network;
a transmitter operable to transmit the charging request message, in response to a determination that a current state of charge of the electric vehicle falls below a minimum state of charge defined by the user profile, and depending on a way of driving the electric vehicle to a remote charging request message processor of the distributed processing network, the charging request message indicating a charging need of the electric vehicle, wherein the charging request message is initiated from a processor module installed within the electric vehicle, the processor module having access to navigational or charging state data of the vehicle;
a receiver operable to receive a result message in response to the charging request message from the remote charging request message processor, the result message comprising user specific result data based on the user's predefined charging preferences stored in the user profile, the user specific result data comprising information on a list of available charging stations corresponding to the predefined charging preferences;
and a learning system or navigational system that can predict where the vehicle will go and how much energy will be left in the battery at any point along a route based on past energy consumption of the user;
wherein the transmitter automatically transmits a charging request message based on the predictions generated; and
reserving a charging station meeting the user's predefined charging preferences based on the user specific result data.

14. An electric vehicle comprising the apparatus of claim 13.

15. An apparatus for reserving a charging station for an electric vehicle according to predefined charging preferences stored in a user profile associated to the electric vehicle, wherein the user profile is stored in a memory within a distributed processing network, the apparatus comprising:
a receiver operable to receive a charging request message related to the electric vehicle, the charging request message, including navigational data, indicating a charging need of the electric vehicle, the charging request message initiated from a processor module installed within the electric vehicle in response to a determination that a current state of charge of the electric vehicle falls below a minimum state of charge defined by the user profile, and depending on a way of driving the electric vehicle;
a charging request message processor operable to process the charging request message using the user's predefined charging preferences stored in the user profile, the predefined charging preferences comprising at least one filter criterion for filtering results in response to a charging request message, the filter criterion comprising at least one criterion of the group of electrical charge pricing of interest, charging station provider of interest, charging station type of interest, and a preferred charging station reservation period, to obtain user specific result data, the user specific result data comprising information on a list of available charging stations corresponding to the predefined charging preferences; and
a transmitter operable to transmit a result message related to the charging request message, the result message comprising the obtained user specific result data for initiating the charging process; and
reserving a charging station meeting the user's predefined charging preferences based on the user specific result data.

* * * * *